Oct. 13, 1925.
F. A. LEIS
BEARING CAP
Filed May 3, 1924
1,556,940
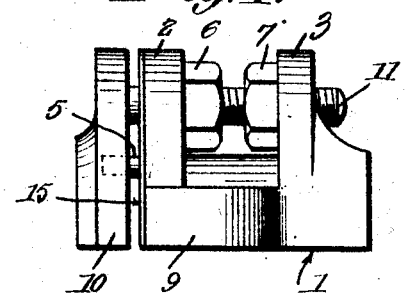
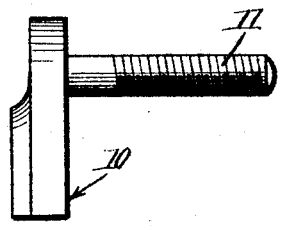
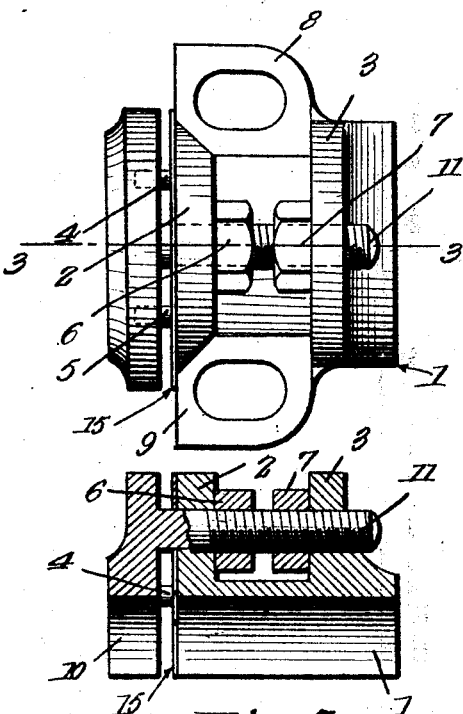
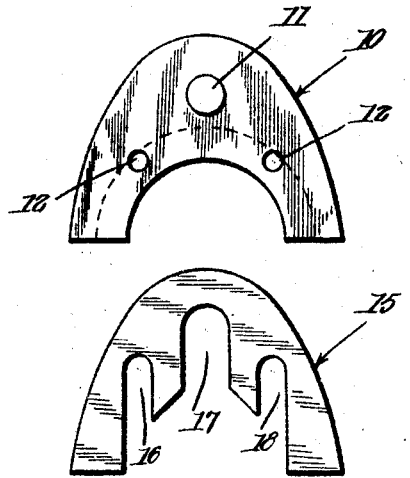
F. A. Leis, Inventor
By C. A. Snow & Co.
Attorneys Patented Oct. 13, 1925.

1,556,940

UNITED STATES PATENT OFFICE.

FRANK A. LEIS, OF GARDEN PLAINS, KANSAS.

BEARING CAP.

Application filed May 3, 1924. Serial No. 710,898.

*To all whom it may concern:*

Be it known that I, FRANK A. LEIS, a citizen of the United States, residing at Garden Plains, in the county of Sedgwick and State of Kansas, have invented a new and useful Bearing Cap, of which the following is a specification.

This invention relates to a crank shaft bearing and more particularly to bearings of this character used on Ford automobiles.

In Ford automobiles the crank shaft is supported in bearings having lower removable bearing caps. The crank shaft of these vehicles at its rear end extends through a stationary ring upon which is arranged a circumferential series of electric pole pieces and carries a rotor or disk upon which is mounted a circumferential series of permanent magnets which, in order to efficiently cooperate with the pole pieces, must be maintained in proper spaced relation with said pole pieces. In the course of time, the bearing caps wear at their ends and the crank attains too great end play. Heretofore it has been considered necessary under such circumstances to replace the worn parts, including the crank shaft, and this has involved not only a dismounting of the engine from the chassis but also considerable expense for replacing parts.

The object of this invention is the construction of a novel bearing which will eliminate end play of the crank shaft and prevent the magnets from being displaced when the inner bearing becomes worn.

Another object is to provide a bearing of this character constructed so that the shaft may be moved or adjusted after the end play has been taken care of.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of the bearing cap constituting this invention with the adjusting collar or yoke shown spaced from the main body of the bearing;

Fig. 2 is a bottom plan view thereof;

Fig. 3 is a longitudinal section taken on the line 3—3 of Fig. 2;

Fig. 4 is a side elevation of the adjusting collar detached;

Fig. 5 is a face view of said collar; and

Fig. 6 is a similar view of one of the shims used as a spacer between the collar and the body of the bearing.

In the embodiment illustrated the main body of the bearings is shown at 1 having two longitudinally spaced flanges 2 and 3 extending transversely of the body which are provided with registering apertures to receive a threaded stud 11 carried by an adjusting collar 10 presently to be described.

The front flange 2 is provided on its outer face which is flush with the main body of the bearing with steel guide pins 4 and 5 arranged on opposite sides of its bolt receiving aperture. These pins 4 and 5 are designed to enter sockets 12 formed in the inner face of the collar 10.

Mounted on the threaded stud 11 between the flanges 2 and 3 are adjusting and lock nuts 6 and 7. By turning these nuts to the left the collar 10 is forced forward to eliminate end play in the crank shaft. After this adjustment has been accomplished nut 6 is turned to the right tightly against flange 2 thus locking both nuts.

Slotted lugs 8 and 9 are arranged at diametrically opposite points on the member 1 between the flanges 2 and 3 thereof and are designed to receive bolts, not shown, which connect this lower bearing member to the upper half of the bearing. The outer faces of the collar 10 and the opposite end of the member 1 fit snugly against the flanges on the crank shaft. It is necessary in Ford motors after a forward adjustment that the revolving magnet pole pieces be given a little clearance. This is accomplished by moving the bearing cap a fraction toward the rear of the motor. After the proper clearance between the magnet pole pieces and the stationary field coil has been obtained the nuts not shown, on the bolts which pass through the slotted lugs 8 and 9 are tightened up thereby positively holding the crank shaft in place.

When the collar 10 is spaced from flange 2 incident to the adjustment of the bearing this space is filled by a shim 15. This shim 15 is constructed as shown in Fig. 6 having slots 16, 17, and 18 opening through its lower edge to slip over the studs 4, 11 and 5 without necessitating disassembling of the bearings. A plurality of these shims are provided for use in connection with each bearing and they are made of different thicknesses for use according to the space between the collar 10 and flange 2.

This reversible bearing is simple and cheap to manufacture and strong in construction and by turning the nuts 6 and 7 the collar 10 may be forced outward to vary the length of the bearing to compensate for wear.

While this improved bearing cap is primarily designed for use in connection with Ford car crank shafts it is of course understood that it is applicable to many other machines where compensation for axial wear of the thrust portion of the bearing is desired.

I claim:

1. A bearing of the class described comprising two members movable longitudinally relative to each other, one having apertured flanges and the other a threaded stud for insertion through said flanges with means for locking said stud in adjusted position, one of said members having guide studs and the other sockets to receive said studs.

2. A bearing of the class described comprising a main body having a plurality of longitudinally spaced apertured flanges, a collar axially movable relative to said body and having a threaded stud extending through the apertures in said flanges with an adjusting and a lock nut on said stud between said flanges of the body member whereby the collar may be moved toward and away from said main body and secured in adjusted position.

3. A bearing of the class described comprising a semi-cylindrical section with slotted ears at the side edges thereof and longitudinally spaced flanges on the outer face, a collar axially movable relative to said body and having a threaded stud extending loosely through said flanges and adjusting nut on said stud to move the collar toward and away from the body section, guide studs carried by one of said members, sockets in the other member to receive said guide studs, and a shim to be located between said collar and body having open slots to fit over said studs.

In testimony that I claim the foregoing as my own, I have hereto affixed my signature.

FRANK A. LEIS.